(12) United States Patent
Christie et al.

(10) Patent No.: US 9,796,115 B1
(45) Date of Patent: Oct. 24, 2017

(54) EXTRUDER SCREW

(71) Applicant: Andrew W. Christie, Fulton, NY (US)

(72) Inventors: Andrew W Christie, Fulton, NY (US); Beth M. Warren, Fulton, NY (US)

(73) Assignee: Andrew W. Christie, Fulton, NY (US)

( * ) Notice: Subject to any disclaimer, the term of this patent is extended or adjusted under 35 U.S.C. 154(b) by 0 days.

(21) Appl. No.: 15/636,418

(22) Filed: Jun. 28, 2017

Related U.S. Application Data

(63) Continuation of application No. 14/308,651, filed on Jun. 18, 2014, now Pat. No. 9,718,216.

(60) Provisional application No. 61/836,447, filed on Jun. 18, 2013.

(51) Int. Cl.
  *B29B 7/00* (2006.01)
  *B29B 7/42* (2006.01)
(52) U.S. Cl.
  CPC .................... *B29B 7/429* (2013.01)
(58) Field of Classification Search
  CPC ....................................................... B29B 7/429
  USPC .............................................. 366/79, 88, 90
  See application file for complete search history.

(56) References Cited

U.S. PATENT DOCUMENTS 5,215,764 A * 6/1993 Davis ...................... B29C 45/60
                                                          366/88

* cited by examiner

*Primary Examiner* — Tony G Soohoo
*Assistant Examiner* — Anshu Bhatia
(74) *Attorney, Agent, or Firm* — Stites & Harbison PLLC; Sean P. Ritchie

(57) ABSTRACT

Embodiments of the presently-disclosed subject matter include extruder screws. Some embodiments of extruder screws include a screw body for placement in an extruder barrel, a plurality of ridges on the outer surface of the screw body that extend helically from an inlet end to an outlet end of the screw body, each adjacent pair of the ridges defining a channel, and one or more notches each extending across one of the plurality of ridges and between an adjacent pair of the channels. The notches can permit a material to flow from one channel into an adjacent channel, and the notches can define crosscuts that extend along the screw body and helically rotate in an opposite direction relative to the plurality of ridges. Furthermore, some extruder screws can further comprise one or more splitter rings.

19 Claims, 4 Drawing Sheets

EXTRUDER SCREW

RELATED APPLICATION

This application is a continuation of U.S. patent application Ser. No. 14/308,651 filed on Jun. 18, 2014, which claims priority to U.S. Provisional Patent Application No. 61/836,447, filed Jun. 18, 2013, the entire disclosures of which are incorporated herein by this reference.

TECHNICAL FIELD

The presently-disclosed subject matter generally relates to an extruder screw. In particular, the presently-disclosed subject matter relates to a mixing section of an extruder screw.

INTRODUCTION

Several different variations of extrusion processes are utilized to melt, mix, and otherwise prepare materials for further processing. For instance, in polymer extrusion processes one or more types of polymer are fed as chips or pellets into the inlet end of an extruder. The rotation of an extruder screw within an extruder barrel can then pump the polymer materials through the extruder and generate heat, stress, and other flow disruptions that melt and mix the polymer materials. The melted mixture can then be discharged from the outlet end of the extruder, and can be used for blow molding, injection molding, flat die forming, and other processes.

Various different types of extruder screws are currently used for different materials and applications. Known extruder screws can comprise different patterns, channels, and flow-interrupters that help mix, heat, pump, and otherwise process a material that flows from the inlet end to the outlet end of the extruder. Furthermore, some extruder screws comprise mixing sections that can be separate from or integral with one or more other screw sections of the extruder screw. Proper mixing of a material generally is important for ensuring the integrity and quality of the products that are formed with the material.

For extrusion mixing in particular, several different screw designs are currently used. One example is the pineapple mixer, which generally comprises two sets of equally sized helical channels that extend along the length of the screw and that are angled relative to one another. Pineapple mixers, however, suffer from lower levels of shear stress that results in poor purging and change over of material, and differential pressure must generate all of the flow within the extruder. Pineapple mixers therefore may achieve distribution of a material, but have poor dispersion characteristics.

A cross hole mixer is also currently used in certain extrusion processes, although it also has relatively low levels of shear stress that make for poor purging and change over, large stagnation regions, and differential pressure generates all the flow of the material. Thus, cross hole mixers have poor dispersion. Other exemplary mixers include the Maddock UCC mixer, the Egan Gregory mixer, and the Wave energy transfer mixer. These mixers fail to achieve both good distribution and dispersion, and suffer from performance flaws such as stagnation of material, low stress levels, and/or require a long screw length.

Hence, there remains a need for a extruder, and particularly a mixing section of an extruder screw, that possesses both good distribution characteristics and good dispersion characteristics. There also remains an extruder screw than can achieve such results with a short overall length. Furthermore, there remains a need for an extruder screw that can achieve high levels of shear with minimal stagnation of material and that can generate flow.

SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

Embodiments of the presently-disclosed subject matter include an extruder screw that comprises a screw body for placement in an extruder barrel that includes an inlet end, an outlet end, and an outer surface, a plurality of ridges on the outer surface of the screw body that extend helically from the inlet end to the outlet end of the screw body, each adjacent pair of the ridges defining a channel, and one or more notches each extending across one of the plurality of ridges and between an adjacent pair of the channels. In some embodiments the screw body includes a cylindrical shape.

Some embodiments further comprise at least one splitter ring that is coaxial with the screw body. In some embodiments an outer diameter of the splitter ring is smaller than an inner diameter of the extruder barrel, and in some embodiments a material can flow through the channels between the splitter ring and the outer surface of the screw body. In some embodiments a first splitter ring is substantially positioned at the inlet end of the screw body, and a second splitter ring is substantially positioned at the outlet end of the screw body. Thus, in some embodiments the ridges and the channels are substantially positioned between a first splitter ring and a second splitter ring.

Additionally, some embodiments further comprise a barrier positioned in one or more of the channels that inhibits a material from flowing through the channels between a splitter ring and the outer surface of the screw body. In some embodiments the channels alternatingly either include or do not include the barrier. In some embodiments the barrier is comprised of a splitter ring. Exemplary barriers can be substantially positioned at the outlet end of the screw body.

In some embodiments each of the plurality of ridges include one or more of the notches. In some embodiments the notches define one or more crosscuts that each extend from the inlet end to the outlet end of the screw body and helically rotate in an opposite direction relative to the plurality of ridges. Exemplary notches can have a height that is less than or equal to a height of the ridges, and in some embodiments the notches only have a height that is less than a height of the ridges.

Accordingly, in some instances there is provided an extruder screw that comprises a screw body having a cylindrical shape for placement in an extruder barrel that includes an inlet end, an outlet end, and an outer surface, a plurality of ridges on the outer surface of the screw body that extend helically from the inlet end to the outlet end of the screw body, each adjacent pair of the ridges defining a channel, a plurality of notches including a height that is less than a height of the ridges that define one or more crosscuts that extend from the inlet end to the outlet end of the screw body, the crosscuts helically rotating in an opposite direction relative to the plurality of ridges, a first splitter substantially positioned at the inlet end of the screw body, and a second splitter substantially positioned at the outlet end of the screw body. In such embodiments a material can flow within the channels between the first splitter ring and the outer surface of the screw body, and the first splitter can include an outer diameter that is smaller than an inner diameter of the extruder barrel. Furthermore, in such embodiments the channels can alternatingly include a barrier that inhibits a material from flowing between the second splitter ring and the outer surface of the screw body.

Further still, the presently-disclosed subject matter can include an extruder screw that comprises a screw body having a cylindrical shape for placement in an extruder barrel that includes an inlet end, an outlet end, and an outer surface, a plurality of ridges on the outer surface of the screw body that extend helically from the inlet end to the outlet end of the screw body, each adjacent pair of the ridges defining a channel, a plurality of notches including a height that is less than a height of the ridges that define one or more crosscuts that extend from the inlet end to the outlet end of the screw body, the crosscuts helically rotating in an opposite direction relative to the plurality of ridges, a first splitter substantially positioned at the inlet end of the screw body, the first splitter including an outer diameter that is smaller than an inner diameter of the extruder barrel and an inner diameter configured to permit a material to flow between the first splitter ring and the outer surface of the screw body, a second splitter substantially positioned at the outlet end of the screw body, and barriers alternatingly positioned at an outlet end of the channels that inhibit a material from flowing between the second splitter ring and the outer surface of the screw body.

In some embodiments the extruder screw can comprise an even number of ridges, wherein half of the channels include one of the barriers.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter includes an extruder screw (mixer). The extruder screw can be used for a mixing section of an extruder screw and can provide both pumping and mixing properties. With regard to mixing, the extruder screw can provide for both the dispersion and the distribution of a material being extruded.

The term "dispersion" is used herein to generally refer to having stress or shear. Dispersion thereby permits material to become elongated and can break down agglomerates of material that form within an extruder barrel. The term "distribution" is used herein to generally refer to rearranging a material with large spacial arrangements, and distribution can refer to the stirring of a material.

Figure 1:
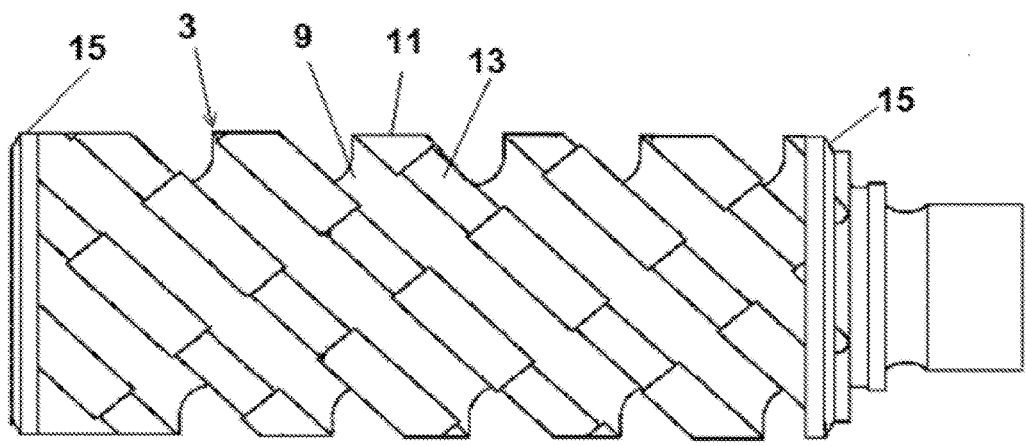
FIG. 1 includes a schematic showing a side view of an extruder screw in accordance with an embodiment of the presently-disclosed subject matter.

An extruder screw in accordance with an embodiment of the presently-disclosed subject matter will now be described with reference to FIGS. 1 to 8. FIG. 1 shows a side view of the exemplary extruder screw 1. The extruder screw 1 comprises an elongated, cylindrical screw body 3 that includes an inlet end 5, an outlet end 7, and an outer surface (not numbered). The extruder screw can process a material that is fed from a feed box, and the processed material can be discharged for further processing, such as an extrusion process. The inlet end 5 generally refers to a side of the extruder screw 1 that is closest to the feed box, and the outlet end 7 generally refers to a side of the extruder screw 1 that is closest to the discharge. Thus, during operation a material will generally flow from the inlet end 5 toward the outlet end 6 of the extruder screw 1.

The extruder screw 1 also comprises a plurality of ridges 11 formed on the outer surface of the screw body 3. The ridges 11 helically extend from the inlet end 5 to the outlet end 7 of the screw body 3. Furthermore, the space between each adjacent pair of the ridges 11 defines a channel 9. The depicted embodiment consists of eight channels 9 that are formed using a ball end mill, wherein each channel is defined by a pair of adjacent ridges 11. However, different extruder screws can comprise any number of ridges and channels that can be formed by any means known in the art. During operation, a material can be fed from the inlet end 5 of the extruder screw 1 and will be pumped through the channels 9 towards the outlet end 7 of the extruder screw 1.

Each ridge 11 is generally an elongated, raised portion located on an outer surface of the screw body 3. Furthermore, when the extruder screw 1 is placed within an extruder barrel (not shown), the top ends of the ridges 11 can be in contact or nearly in contact with an inner surface of the extruder barrel. In this manner, when the extruder screw 1 is being operated a material will be pumped through the helical channels 9. Furthermore, top ends of the ridges 11 that contact or nearly contact the inner surface of the extruder barrel can sweep material from the inner surface of the extruder barrel when the extruder screw is rotated.

The extruder screw 1 further comprises one or more notches 13 formed along each of the ridges 11. Each notch 13 extends across one ridge 11 and between an adjacent pair of the channels 9. In some embodiments, at least one ridge 11 comprises at least one notch 13, and in some embodiments each ridge 11 comprises a plurality of notches 13.

The notches 13 generally are a groove, rut, channel, or the like that are formed across the width of a ridge 11. The notches 13 therefore form a depressed section of the ridge 11 that has a lower height relative to adjacent portions of the ridge 11. During operation, a material can flow through the notches 13, and, as described below, can allow a material to flow from the outlet end 7 toward the inlet end 5 of the extruder screw 1. Also as described below, notches 13 can permit a material to flow between adjacent channels 9.

FIG. 1 also shows two splitter rings 15 that are coaxial with the screw body 3. Each splitter ring 15 comprises an inner diameter defined by an inner surface of the splitter ring 15 and an outer diameter defined by an outer surface of the splitter ring 15. The outer diameter of the splitter ring 15 can be smaller than an inner diameter of the extruder barrel. Furthermore, the inner diameter of the splitter ring 15 can be equal to or greater than a diameter of the screw body 3, or at least the portion of the screw body 3 to which the splitter ring 15 is attached. Accordingly, in some embodiments the splitter rings 15 can split the flow of a material such that one portion of the material flows between the inner surface of the splitter ring 15 and the outer surface of the screw body 3, and the other portion of the material flows between the outer surface of the splitter ring 15 and an inner side of the extruder barrel. Without being bound by theory or mechanism, in some instances the material flow split caused by a splitter ring 15, and particularly the flow of the material between the outer surface of the splitter ring 15 and the inner side of the extruder barrel, can contribute to the dispersion characteristics of an extruder screw.

FIG. 1 shows a first splitter ring 15 substantially positioned located at the inlet end 5 of the screw body 3, and a second splitter ring 15 substantially positioned at the outlet end 7 of the screw body 3. More specifically, the two splitter rings 15 depicted in FIG. 1 are positioned on opposite ends of the screw body 3, and have the channels 9, ridges 11, and the like interposed therebetween. However, in other embodiments one or more splitter rings can be positioned at any location along the length the extruder screw.

Figure 2:
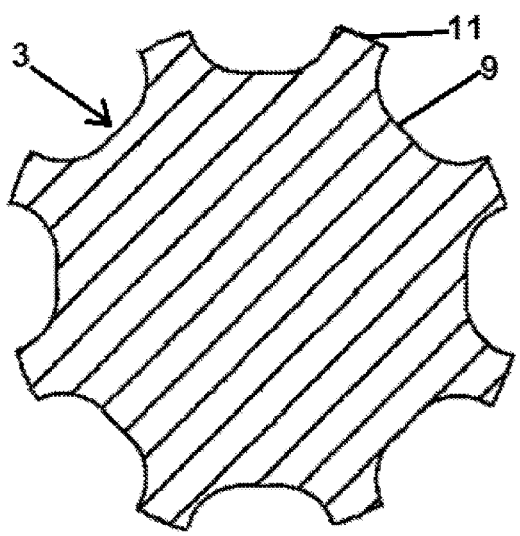
FIG. 2 includes a cross-sectional view showing the extruder screw without a splitter ring.
Figure 3:
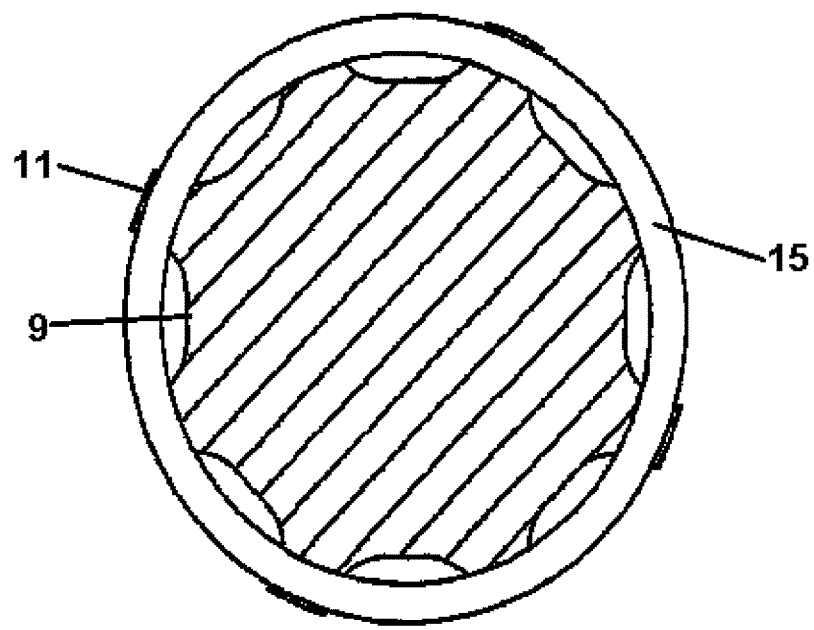
FIG. 3 includes a cross-sectional view showing the extruder screw with a splitter ring.

Looking now to FIGS. 2 and 3, cross-sectional views of the exemplary extruder screw are shown. FIG. 2 shows a cross-sectional view of the extruder screw at a location that does not include a splitter ring. The exemplary extruder screw comprises eight channels 9 that are each separated by one of eight ridges 11.

FIG. 3 shows a cross sectional view of the extruder screw taken a point where a splitter ring 15 is located. The inner diameter of the splitter ring 15 is dimensioned such that a material can flow through the channels 9 between the inner side of the splitter ring 15 and the outer surface of the screw body 3. FIG. 3 also shows that, due to the presence of the notches 13, the ridges 11 alternatingly (i.e., every other) project radially from an outer surface of the splitter ring 15, whereas the remaining four ridges 11 are concealed by the splitter ring 15. Accordingly, the outer diameter of the splitter ring 15 is less than a diameter of a circle defined by the taller set of ridges 11 (i.e., four ridges 11 projecting from splitter ring 15). In this manner, even if an extruder barrel is in contact or nearly in contact with the taller set of ridges 11, a material can flow through a gap formed between the outer surface of the splitter ring 15 and the inner surface of the extruder barrel.

The splitter ring 15 is not limited to this configuration, and can be modified in various ways. For example, all of the portions of the ridges 11 that contact the splitter ring can include an equal height and can form a circle having a diameter that is greater than an outer diameter of the splitter ring 15. In other embodiments the ridges 11 define a circle having a diameter that is equal to or less than an outer diameter of the splitter ring 15, but a gap may or may not be present between an outer surface of the splitter ring 15 and the inner surface of the extruder barrel to allow for a material to flow therethrough.

Figure 4:
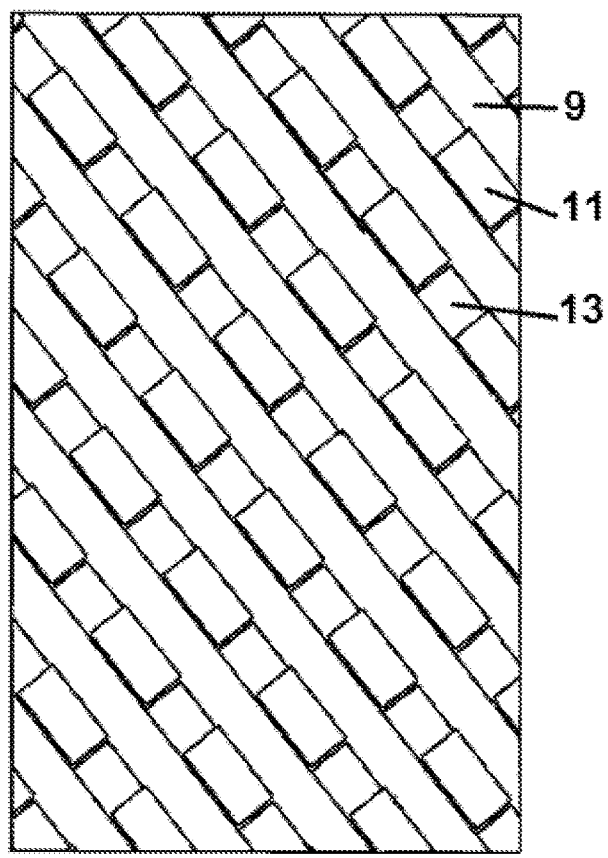
FIG. 4 includes an unwound view of the extruder screw showing the outer surface of the extruder screw.

Looking now to FIG. 4, an unwound view of the exemplary extruder screw 1 is shown. The unwound view shows the entire outer surface of the extruder screw 1 on a flat plane. More specifically, FIG. 4 shows parallel, helical channels 9 that are each separated by a ridge 11. Each ridge 11 comprises a plurality of the notches 13 that connect adjacent channels 9.

Furthermore, the notches 13 are arranged so that the notches 13 define a plurality of parallel, crosscuts (not numbered). The crosscuts comprised of the notches 13 extend from the inlet end 5 to the outlet end 7 of the screw body 3, and helically rotate around the screw body 3 in an opposite direction relative to the plurality of ridges 11. Thus, the channels 9 and the crosscuts comprised of the notches 11 form a grid-like pattern on the outer surface of the screw body 3.

Figure 5:
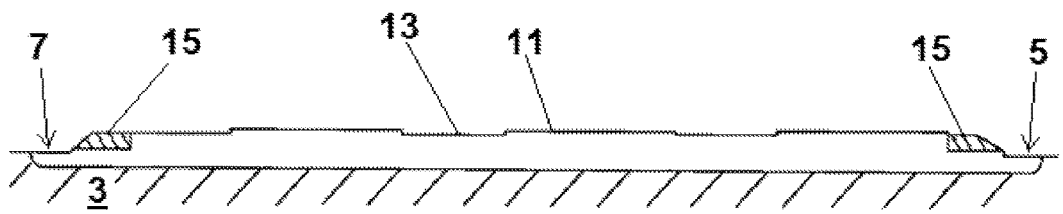
FIG. 5 includes cross-sectional view taken along the length of a channel having an open inlet end and an open outlet end showing the ridge profile and splitter rings for the channel.
Figure 6:
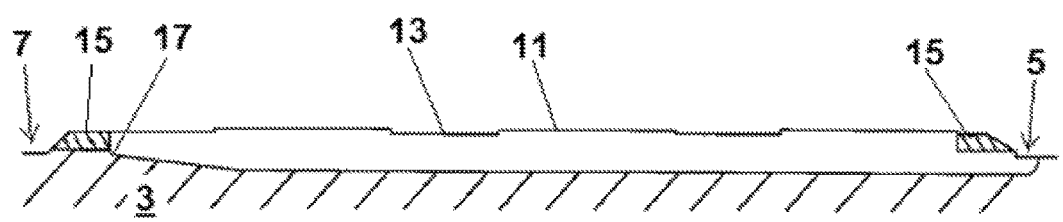
FIG. 6 includes cross-sectional view taken along the length of a channel having an open inlet end and a barrier at the outlet end showing the ridge profile and splitter rings for the channel.

Referring now to FIGS. 5 and 6, cross-sectional views taken along the length of channels are shown. FIG. 5 shows a view of a channel 9 having a first splitter ring 15 at the inlet end 5 and a second splitter ring 15 at the outlet end 7 of the screw body 3. The ridge 11 extends the length of the channel 9 between the splitter rings 15 and comprises a plurality of the notches 13. The notches 13 are formed to have a height that is less than a height of the ridges 11. In this manner, the channels 9 formed by the ridges 11 can act as primary channels 9 for directing the flow of a material, and the crosscuts comprised of the notches 11 can act as secondary channels for material flow.

Furthermore, FIG. 5 shows a gap between an inner surface of the splitter rings 15 and the screw body 3. Consequently, during operation, a material can flow within the channel 9 through an opening formed between the inner surface (bottom end side in FIG. 5) of the splitter rings and the outer surface of the screw body 3. In some embodiments material can also flow over an outer surface of the splitter rings 15 (top end side in FIG. 5).

On the other hand, FIG. 6 shows a channel 9 that includes a barrier 17 inhibits a material from flowing from the inlet end 5 to the outlet end 7. Channels 9 that have barriers 17 that partially or wholly block the flow of material in this matter are referred to herein as "dead end channels." Any number of channels 9 can comprise a barrier 17. In some embodiments one channel 9 comprises a barrier 17, and in other embodiments two or more channels 9 comprise a barrier 17. In yet other embodiments, the channels 9 alternatingly include a barrier 17 so that the channels 9 alternate between comprising and not comprising a barrier 17.

As shown in FIG. 6, the outlet end 7 of the channel 9 (left side) comprises a barrier 17 that is comprised of the second splitter ring 15. More specifically, the diameter of the screw body 3 becomes greater toward the outlet end 7 of the screw body 3 such that the outer surface of the screw body 3 contact the inner surface of the second splitter ring 15. The second splitter ring 15 at the outlet end 7 thereby forms a barrier 17 that can block a material from discharging from the channel 9. Material may or may not be able to flow over the outer surface of the splitter ring 15 (i.e., between the splitter ring 15 and an inner surface of the extruder barrel).

Different embodiments can comprise channels 9 having a constant depth and/or a depth that varies. In some embodiments the depth of a channel 9 can be tapered. For example, in FIG. 5 the depth of the channel 9 is constant, whereas in FIG. 6 the depth of the channel 9 is constant starting from the inlet end 5, but tapers for the section of the channel 9 that is immediately upstream of the outlet end 7.

Barriers 17 can create backpressure within a dead end channel, and, consequently, the material can move via the notches 13 from the dead end channel to other channels 9 that have a relatively lower pressure. The notches 13 therefore permit material to flow, at least partially, from the outlet end 7 to the inlet end 5 of the extruder screw 1, and into channels 9 that more freely permit the material to discharge from the outlet end 7 of the extruder screw 1.

In some embodiments the barrier 17 is a distinct element from the splitter ring 15. Some barriers completely block material from exiting the dead end channels, whereas some barriers only partially block material from exiting a dead end channel (see, e.g., FIG. 6). Further still, barriers 17 can be located at any location that is downstream from the inlet end 5 and at least one notch 11.

Figure 7:
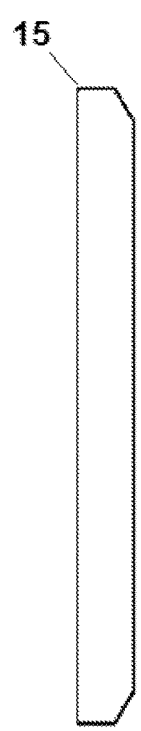
FIG. 7 includes a side view of a splitter ring in accordance with an embodiment of the presently-disclosed subject matter.
Figure 8:
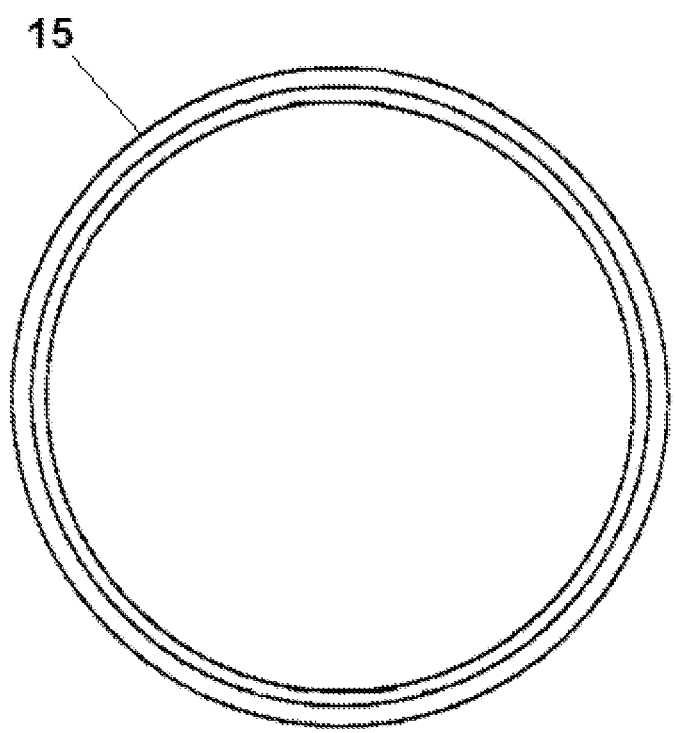
FIG. 8 includes a front view of a splitter ring in accordance with an embodiment of the presently-disclosed subject matter.

Looking now to FIGS. 7 and 8, a side view and a front view of a splitter ring 15 are shown, respectively. The splitter ring 15 comprises an inner diameter defined by its inner surface and an outer diameter defined by its outer surface. The splitter ring 15 further comprises a chamfer on one side that extends from the outer surface of the splitter ring 15. FIGS. 5 and 6 show that the chamfer of the splitter rings 15 can be oriented to face away from the center point of the extruder screw 1. Other embodiments of splitter rings 15 comprise no chamfer, curved surface, or other shape. In embodiments having two or more splitter rings 15, each splitter ring can have a different shape and/or orientation.

The splitter rings 15 may be separate from or integral with the screw body 3. In some embodiments the splitter rings 15 are welded to the screw body 3. Those of ordinary skill in the art will appreciate other means for coupling splitter rings 15 to the screw body 3 and/or forming splitter rings 15 that are integral with the screw body 3.

Embodiments of the presently-disclosed subject matter resolve many long-felt but unmet needs. Some embodiments of the presently-disclosed extruder screws can provide excellent mixing while requiring a short overall screw length. Exemplary extruder screws also comprise features that both distribute and disperse a material, and this novel combination provides superior material processing and mixing characteristics. Exemplary screws can pump material from an inlet end to an outlet end of the screw while minimizing or eliminating the stagnation of material that is experienced by known screw designs, and which otherwise reduces screws' ability to mix and process material.

The presently-disclosed subject matter also provides for extruder screw that are highly versatile both in terms of the systems they can be used with and in terms of the materials that can process. The extruder screws may be integral with other portions of a screw, or can be a distinct section that can be attached (e.g., welded, screwed, or the like) to an existing screw. Therefore, embodied extruder screws can be implemented into existing systems. The extruder screws can also be used for a multitude of extrusion processes, wherein the extruded materials can be used for injection molding, blow molding, or any flat die forming process to make, for example, films, coating, sheets, etc., and the like. Those of ordinary skill upon reviewing this paper will appreciate the wide range of applications possible with embodied extruder screws.

In this regard, the term "material" is used herein to refer to any material that may be used in an extrusion process. Materials include plastics, polymers, metals and the like. Those of ordinary skill will appreciate other materials and more specific types materials that can be used with embodied extruder screws. Furthermore, material is used herein to refer to a composition containing one type of a material as well as mixtures of two or more types of materials.

The presently-disclosed subject matter further includes methods for extruding a material. The method can comprise a first step of providing one of the extruder screws described herein, providing a material to the inlet end of the screw body, rotating the extruder screw within the extruder barrel to thereby mix and pump the material from the inlet end to the outlet end of the extruder screw, and then collecting the material that is discharged from the outlet end of the screw body. Material may be collected for any purpose, including injection molding, blow molding, or other processes.

Examples

The presently-disclosed subject matter is further illustrated by the following specific but non-limiting example. The following example contains data that is representative of data gathered during the course of development and experimentation related to the presently-disclosed subject matter.

The exemplary extruder screw is a mixing section of an extruder screw that can be mounted either upstream or downstream of other extruder screw sections. The screw body has an overall effective length of 4 inches and an outside diameter of 1.995 inches. Next, using 0.25 inch ball end mill, 8 helical grooves are cut along the outer surface of the screw body in a helical fashion and extending from an inlet end to an outlet end of the screw body. The helical grooves are cut at 39.7 degrees relative to a longitudinal direction of the screw body. The resulting screw body comprises eight channels that are about 0.200 inches deep, 0.25 inches wide, and that are separated by ridges that are also 0.25 inches wide. Four of the channels are formed to be slightly shorter in length than the other four channels, and will eventually form dead end channels, as described further below.

Next, helical cross-cut channels are formed in the screw body. The cross-cut channels are cut at 37.04 degrees relative to a longitudinal direction of the screw body and form a grid with the primary channels. The cross-cut channels are formed by making a plurality of undercuts along the length of each of the ridges. The undercuts are 0.5 inches wide, 0.015 inches deep, and are each separated by a 0.75 inch length of the ridge.

Next, a pair of ring splitters are formed. The ring splitters have an outer diameter of 1.965 inches, a thickness (in direction from outer surface to inner surface) of 0.11 inches, and a length of 0.458 inches. A chamfer is formed on one side of each splitter ring from the outer surface of the splitter rings. Next, the splitter rings are attached to the inlet end and the outlet end of the screw body, and may be attached by welding. The splitter ring at the outlet end is dimensioned so that an outer surface of the screw body contacts the inner surface of the splitter ring at a location where each of the four dead end channels have not been fully grooved. Thus, the splitter ring will form a barrier in the four dead end channels since material will not be able to flow from the dead end channel and through the center of the splitter ring to exit the extruder screw.

While the terms used herein are believed to be well understood by one of ordinary skill in the art, the definitions set forth herein are provided to facilitate explanation of the presently-disclosed subject matter.

The terms "comprising", "including," and "having" are intended to be inclusive and mean that there may be additional elements other than the listed elements.

Following long-standing patent law convention, the terms "a", "an", and "the" refer to "one or more" when used in this application, including the claims. Thus, for example, reference to "a channel" includes a plurality of such channels, and so forth.

Unless otherwise indicated, all numbers expressing quantities, measurements, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter to a value or to an amount of mass, weight, time, volume, concentration or percentage is meant to encompass variations of in some embodiments 150%, in some embodiments 140%, in some embodiments 130%, in some embodiments 120%, in some embodiments 110%, in some embodiments 15%, in some embodiments 11%, in some embodiments 10.5%, and in some embodiments 10.1% from the specified amount, as such variations are appropriate to. The term "substantially" can be used interchangeably with "about" herein. For instance, a splitter ring substantially positioned at an inlet end of a screw body can be about 20% or less of the distance from the inlet end of the screw body relative to the entire length of the screw body.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Throughout this document, various references are mentioned. All such references, are incorporated herein by reference.

What is claimed is:

1. An extruder screw, comprising:
   a screw body for placement in an extruder barrel that includes an inlet end, an outlet end, and an outer surface;
   a plurality of adjacent ridges on the outer surface of the screw body, each ridge extending helically from the inlet end to the outlet end of the screw body;
   at least two channels formed in the screw body, each of the channels being defined by a pair of the adjacent ridges;
   and one or more notches formed in each of the ridges, each notch extending between an adjacent pair of the channels;
   wherein the notches in each of the ridges form one or more crosscuts extending from the inlet end to the outlet end of the screw body and helically rotating in an opposite direction relative to the plurality of ridges further comprising at least one splitter ring that is coaxial with the screw body.

2. The extruder screw of claim 1, wherein the screw body includes a cylindrical shape.

3. The extruder screw of claim 1, wherein an outer diameter of the splitter ring is smaller than an inner diameter of the extruder barrel.

4. The extruder screw of claim 1, wherein a material can flow through the channels between an inner surface of the splitter ring and the outer surface of the screw body.

5. The extruder screw of claim 1, wherein the at least one splitter ring comprises at least a first splitter ring and a second splitter ring, the first splitter ring being substantially positioned at the inlet end of the screw body and the second splitter ring being substantially positioned at the outlet end of the screw body.

6. The extruder screw of claim 5, wherein the ridges and the channels are substantially positioned between the first splitter ring and the second splitter ring.

7. The extruder screw of claim 1, wherein one or more of the channels include a barrier that inhibits a material from flowing through the channels between an inner surface of a splitter ring and the outer surface of the screw body.

8. The extruder screw of claim 7, wherein the barrier is comprised of a splitter ring.

9. The extruder screw of claim 7, wherein the one or more of the barriers are substantially positioned at the outlet end of the screw body.

10. The extruder screw of claim 9, wherein the channels alternatingly include the barrier.

11. The extruder screw of claim 1, wherein each of the plurality of ridges includes more than one of the notches.

12. The extruder screw of claim 11, wherein each notch in a single ridge forms a portion of a separate crosscuts extending from the inlet end to the outlet end of the screw body and helically rotating in an opposite direction relative to the plurality of ridges.

13. The extruder screw of claim 1, wherein the notches have a height that is less than or equal to a height of the ridges.

14. The extruder screw of claim 1, wherein the notches have a height that is less than a height of the ridges.

15. An extruder screw, comprising:
    a screw body having a cylindrical shape for placement in an extruder barrel that includes an inlet end, an outlet end, and an outer surface;
    a plurality of adjacent ridges on the outer surface of the screw body, each ridge extending helically from the inlet end to the outlet end of the screw body;
    at least two channels formed in the screw body, each of the channels being defined by a pair of the adjacent ridges;
    at least one notch in each of the ridges, the notches defining one or more crosscuts that extend from the inlet end to the outlet end of the screw body, the crosscuts helically rotating in an opposite direction relative to the plurality of ridges; and
    at least one splitter ring, each splitter ring being positioned at the inlet end of the screw body or the outlet end of the screw body.

16. The extruder screw of claim 15, wherein a material can flow within the channels between an inner diameter of the at least one splitter ring and the outer surface of the screw body, and wherein the first splitter includes an outer diameter that is smaller than an inner diameter of the extruder barrel.

17. The extruder screw of claim 15, wherein the channels alternatingly include a barrier that inhibits a material from flowing between an inner surface of at least one splitter ring and the outer surface of the screw body.

18. An extruder screw, comprising:
    a screw body having a cylindrical shape for placement in an extruder barrel that includes an inlet end, an outlet end, and an outer surface;

a plurality of adjacent ridges on the outer surface of the screw body, each ridge extending helically from the inlet end to the outlet end of the screw body;

at least two channels formed in the screw body, each of the channels being defined by a pair of the adjacent ridges;

at least one notch having a height that is less than a height of the ridges formed in each of the ridges, the notches defining one or more crosscuts that extend from the inlet end to the outlet end of the screw body, the crosscuts helically rotating in an opposite direction relative to the plurality of ridges;

a first splitter substantially positioned at the inlet end of the screw body, the first splitter including an outer diameter that is smaller than an inner diameter of the extruder barrel and an inner diameter configured to permit a material to flow between the first splitter ring and the outer surface of the screw body; and a second splitter substantially positioned at the outlet end of the screw body; and barriers alternatingly positioned at an outlet end of the channels that inhibit a material from flowing between the second splitter ring and the outer surface of the screw body.

19. The extruder screw of claim 18, wherein the extruder screw comprises an even number of ridges, and wherein half of the channels include one of the barriers.

\* \* \* \* \*